BEST AVAILABLE COPY

United States Patent

Des. Re. 28,854
Reissued June 8, 1976

28,854

FLOWER POT

Rodney Dennis Bufton, by the Lucas Electrical Company Ltd., Birmingham, England, assignee Original No. Des. 233,058, dated Oct. 1, 1974, Ser. No. 372,100, June 21, 1973. Application for reissue May 13, 1975, Ser. No. 577,084

Claims priority, application United Kingdom Dec. 21, 1972

Term of patent 14 years

Int. Cl. D11—*02*

U.S. Cl. D35—3 A

Matter enclosed in heavy brackets [ ] appears in the original patent but forms no part of this reissue specification; matter printed in italics indicates the additions made by reissue.

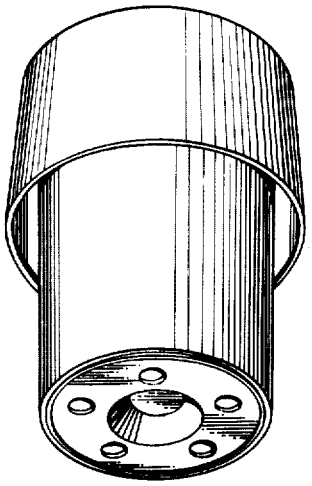

FIG. 1.

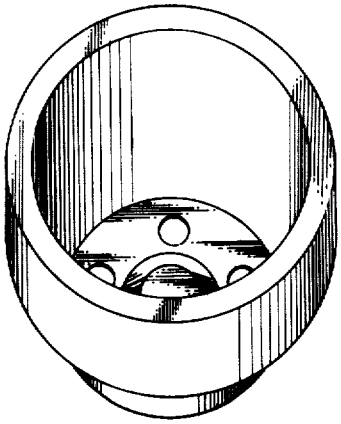

FIG. 2.

BEST AVAILABLE COPY

BEST AVAILABLE COPY

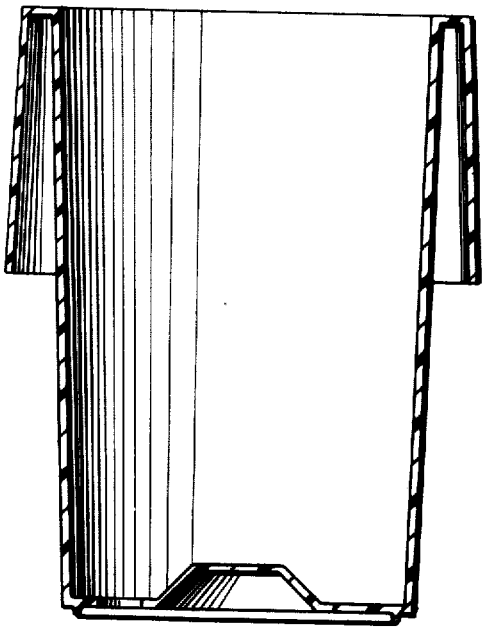

FIG.3.

FIG. 1 is a bottom perspective view of a flower pot showing my new design.

FIG. 2 is a top perspective view thereof; and

FIG. 3 is a cross section taken substantially through the center of FIG. 1.

I claim:

The ornamental design for a flower pot, substantially as shown.

References Cited

UNITED STATES PATENTS

The following references, cited by the Examiner, are of record in the patented file of this patent or the original patent.

| | | | |
|---|---|---|---|
| D. 20,337 | 11/1890 | Wailldin | D35—3 A |
| D. 20,523 | 2/1891 | Balsley | D35—3 A |
| D. 182,130 | 2/1958 | Luipersbek | D35—3 A |
| 1,710,878 | 4/1929 | Kelso | 47—34 |
| 2,700,847 | 2/1955 | Brasol | 47—34 |

BERNARD ANSHER, Primary Eraminer